United States Patent
Kircanski et al.

(10) Patent No.: US 7,262,575 B2
(45) Date of Patent: Aug. 28, 2007

(54) METHOD AND APPARATUS FOR PRECISE POSITIONING OF AN OBJECT WITH LINEAR STEPPER MOTORS

(75) Inventors: Nenad Kircanski, Toronto (CA); Amir Sadri, Toronto (CA); Milija Timotijevic, Toronto (CA); Zhiliang Xu, Mississauga (CA); Manja Kircanski, Toronto (CA); Neven Nikolic, Mississauga (CA)

(73) Assignee: Bio-Rad Laboratories, Inc., Hercules, CA (US)

( * ) Notice: Subject to any disclaimer, the term of this patent is extended or adjusted under 35 U.S.C. 154(b) by 121 days.

(21) Appl. No.: 11/285,228

(22) Filed: Nov. 21, 2005

(65) Prior Publication Data

US 2006/0138977 A1    Jun. 29, 2006

Related U.S. Application Data

(60) Provisional application No. 60/632,576, filed on Dec. 1, 2004.

(51) Int. Cl.
*G05B 19/40* (2006.01)
(52) U.S. Cl. .................. 318/685; 318/696; 318/135; 318/38; 318/687
(58) Field of Classification Search .............. 318/685, 318/696, 135, 38, 687
See application file for complete search history.

(56) References Cited

U.S. PATENT DOCUMENTS 5,048,813 A * 9/1991 Wierszewski et al. ........ 271/98

* cited by examiner

*Primary Examiner*—Karen Masih
(74) *Attorney, Agent, or Firm*—Townsend and Townsend and Crew LLP; Gerald T. Gray

(57) ABSTRACT

Methods and apparatus for precise positioning of an object using linear actuators based on linear stepper motors operating in microstepping or full step mode, a control algorithm based on compensation table, and a calibration apparatus for obtaining the compensation table.

20 Claims, 11 Drawing Sheets

Linear stepper motor includes a stationary Platen and moving body (Forcer) that contains coils A and B (2-phase motor) and a permanent magnet. By energizing coils in a certain order, the forcer moves in controllable steps along the platen.

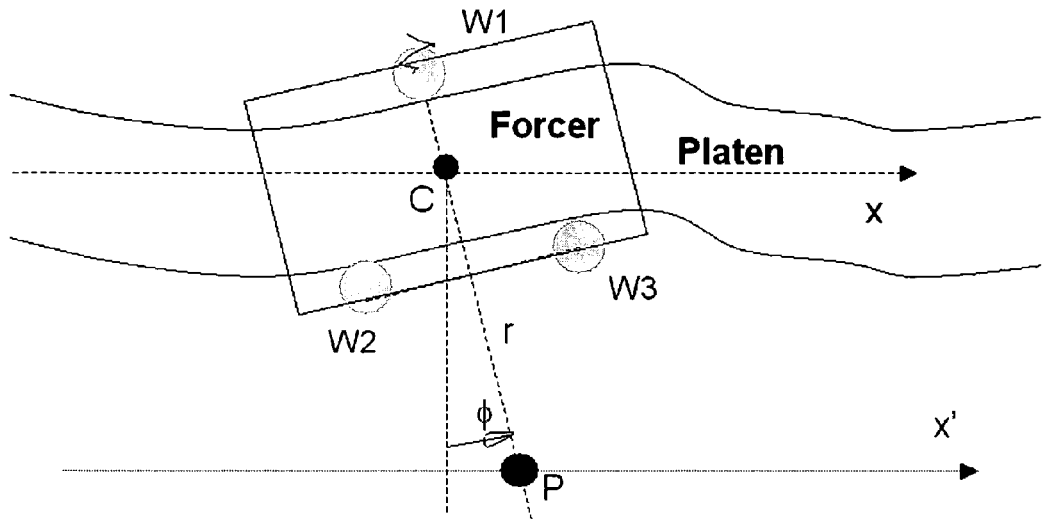

Fig. 2 Linear stepper motor includes a Forcer moving, along the Platen, the object (P) attached at a distance (r) from the center (C) of the forcer. Two wheels (W2 and W3) as well as the third spring-loaded wheel (W1) are guiding the forcer along the platen. The forcer follows the platen undulations (exaggerated in this figure) while moving along the X axis.

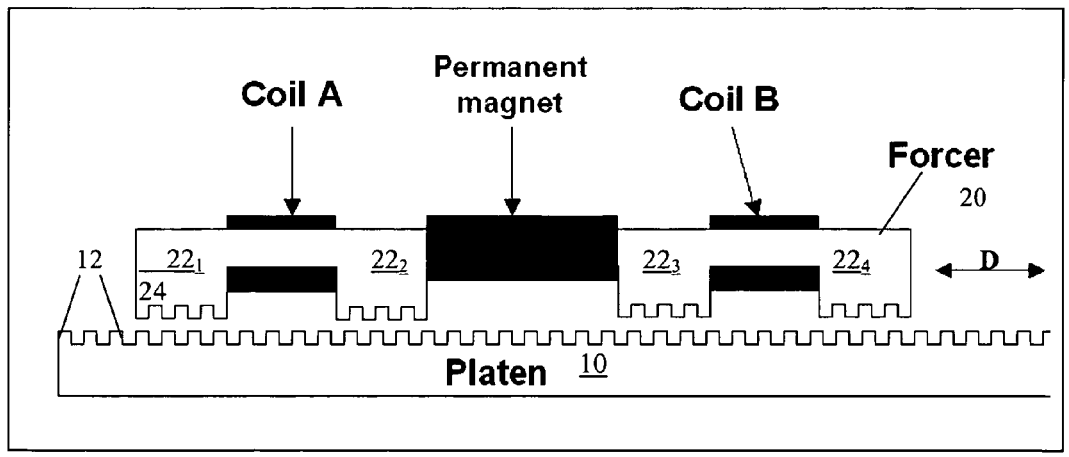

Fig. 1 Linear stepper motor includes a stationary Platen and moving body (Forcer) that contains coils A and B (2-phase motor) and a permanent magnet. By energizing coils in a certain order, the forcer moves in controllable steps along the platen.

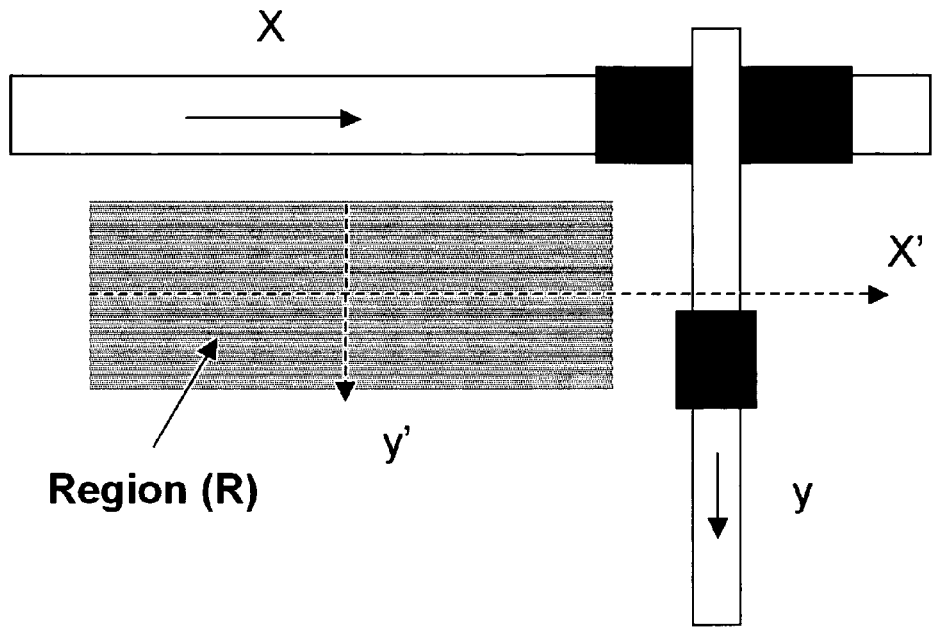
Fig. 3a. X-Y positioning stage, including X and Y actuators, with a rectangular precision zone, Region (R).
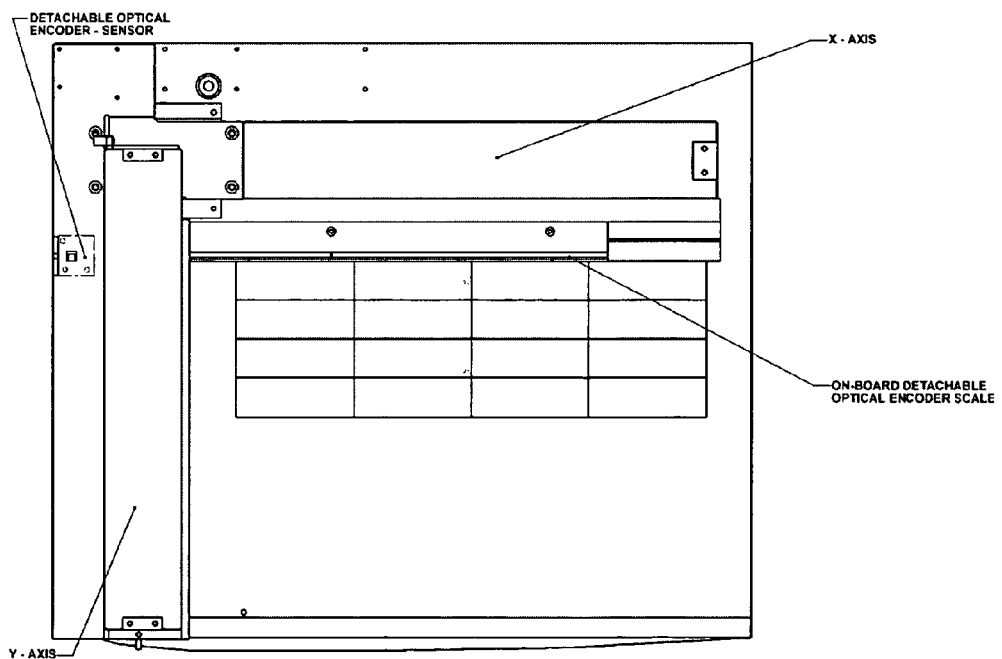
Fig. 3b. An illustration of a calibration setup including a permanent encoder in one aspect, or an X-Y stage apparatus including a detachable encoder in another aspect.

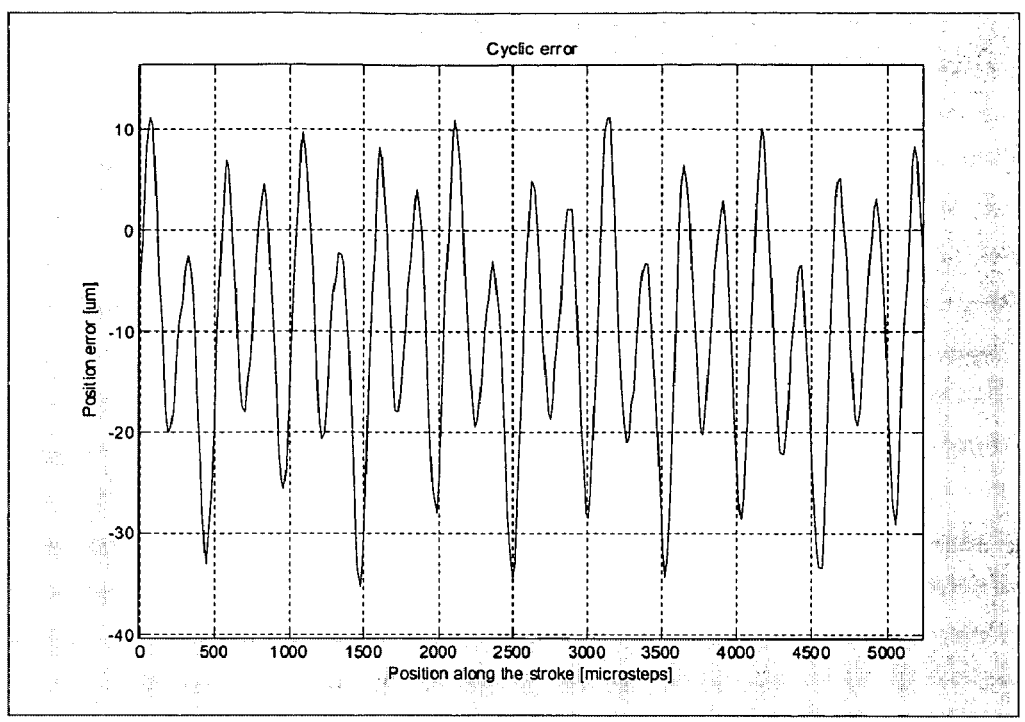
FIG. 4: An example of linear stepper motor cyclic error

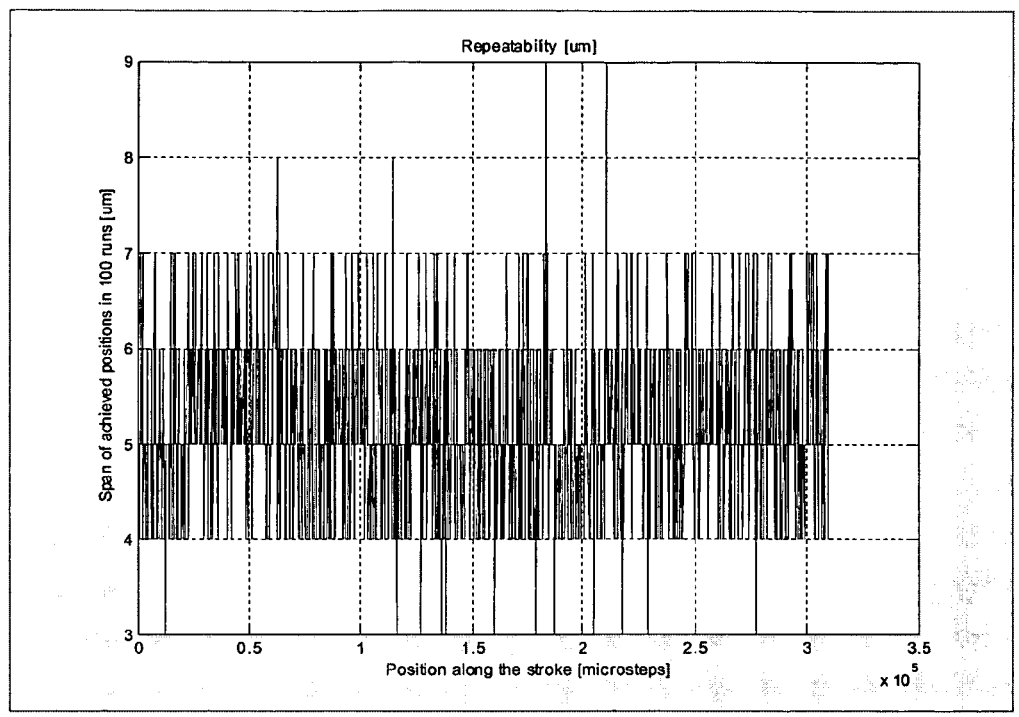
FIG. 5: Illustration of the stepper motor repeatability
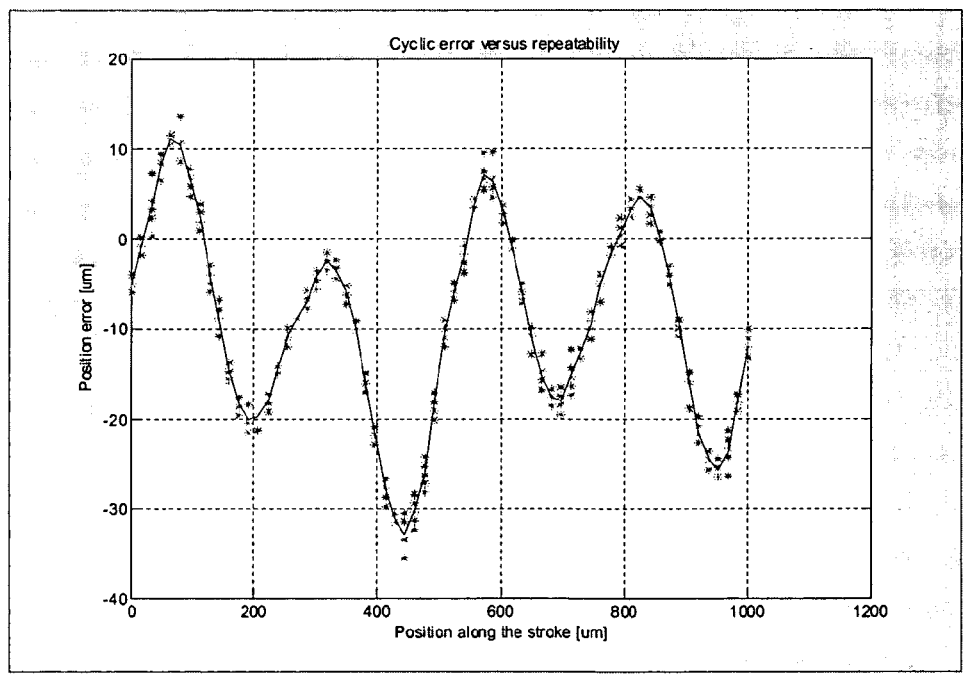
FIG. 6a: Illustration of the stepper motor cyclic error versus repeatability

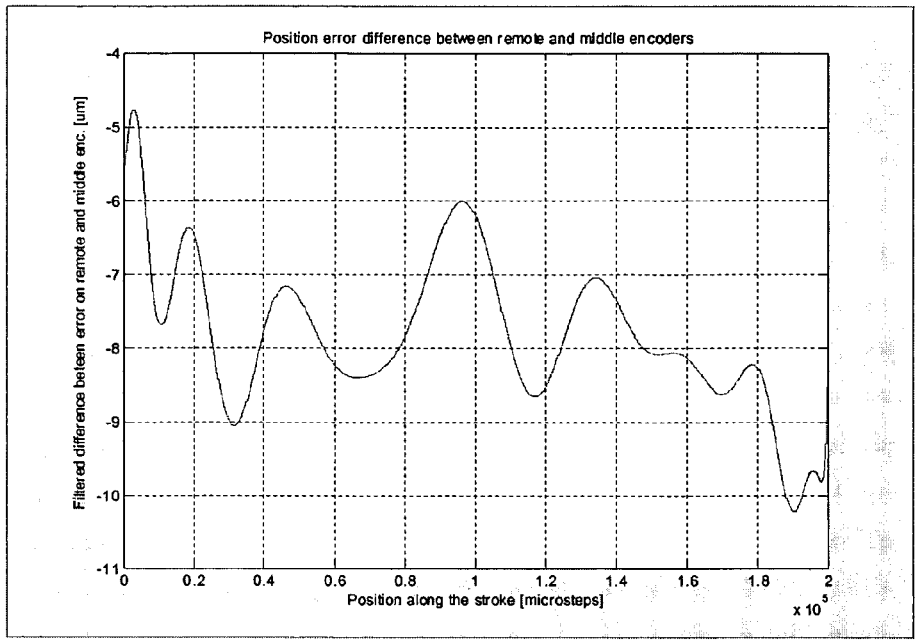
FIG. 6b Illustration of the impact of forcer orientation error on the total position error when measured at two different distances from the platen
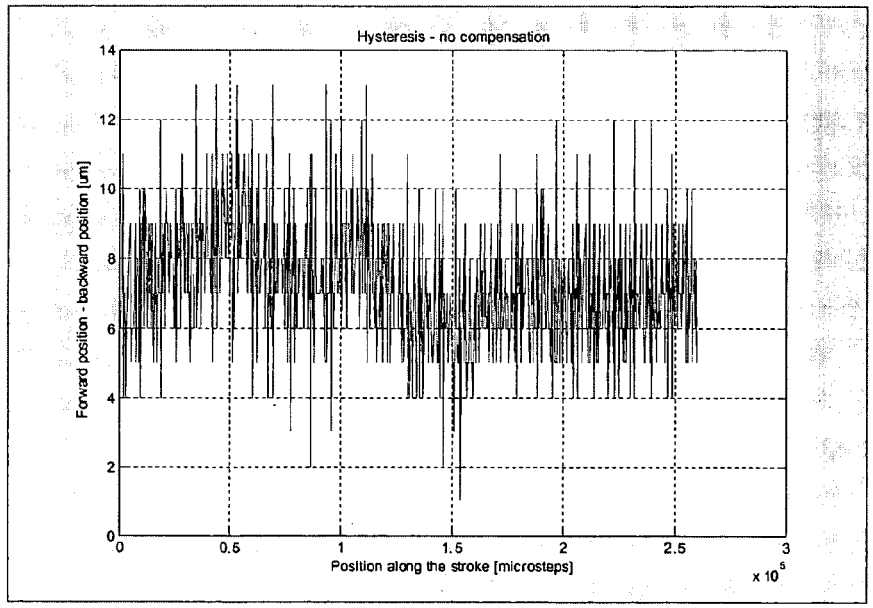
FIG. 7: Hysteresis along the stroke of the actuator

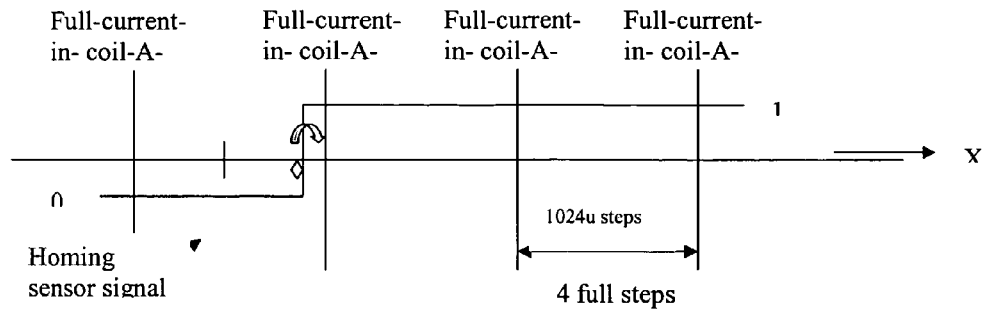
FIG. 8a Illustration of a conventional homing process (prior art) when the sensor position is adjusted well.
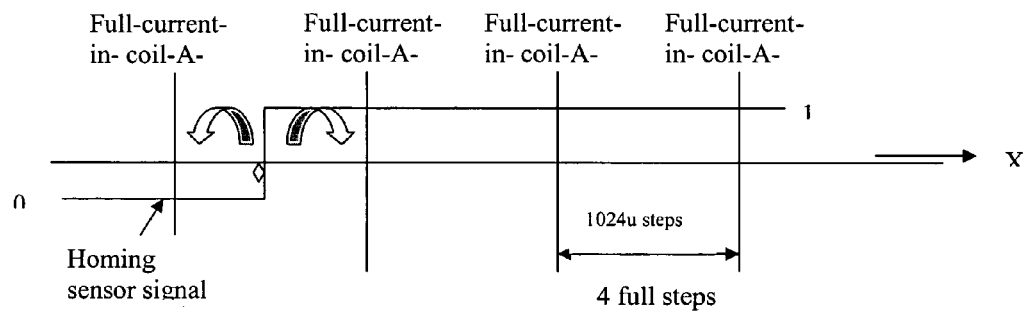
FIG. 8b Illustration of a conventional homing process (prior art) when the sensor position is not adjusted well.
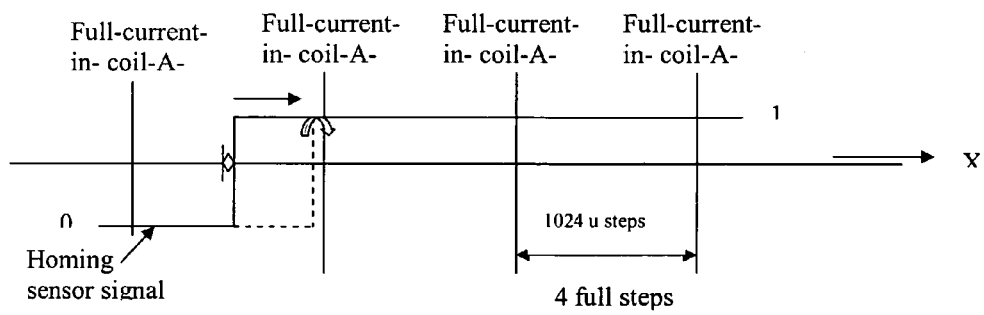
FIG. 9 Illustration of a homing process according to an embodiment of the present invention.

| Commanded position in microsteps | Actual position in forward direction in µm | Actual position in backward direction in µm |
|---|---|---|
| 0 | $y_f(0)$ | $y_b(0)$ |
| $n_s$ | $y_f(1)$ | $y_b(1)$ |
| $2n_s$ | $y_f(2)$ | $y_b(2)$ |
| ... | ... | ... |
| ... | ... | ... |
| $kn_s$ | $y_f(k)$ | $y_b(k)$ |
| $(k+1)n_s$ | $y_f(k+1)$ | $y_b(k+1)$ |
| ... | ... | ... |
| ... | ... | ... |
FIG. 10: Compensation table
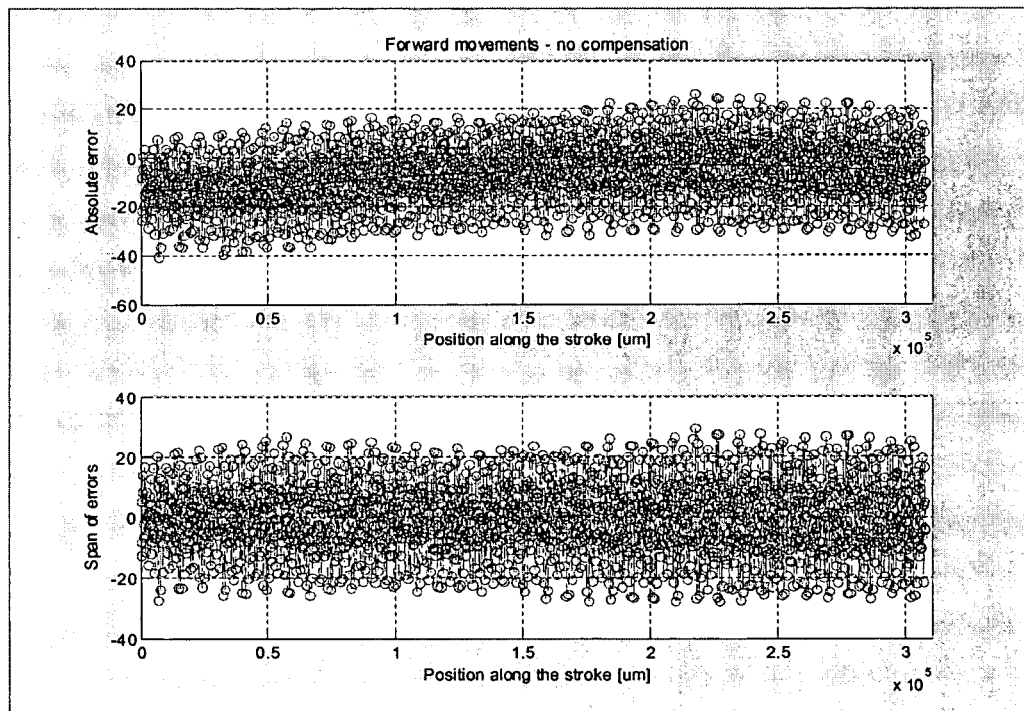
FIG. 11. Absolute position errors and span of errors for forward movements on an uncalibrated linear stepper motor

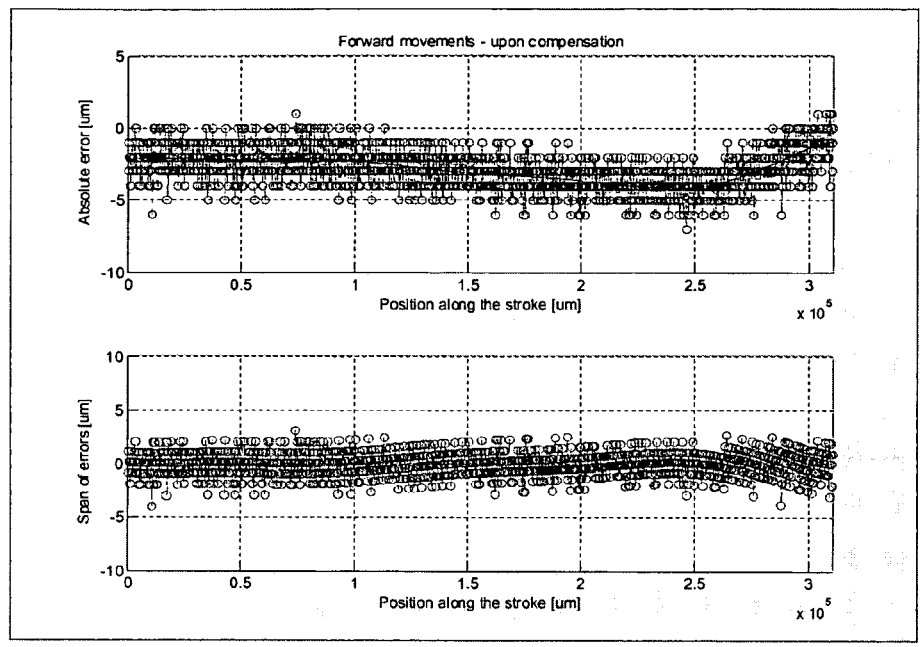
FIG. 12: Absolute position errors and span of errors for forward movements on a calibrated linear stepper motor
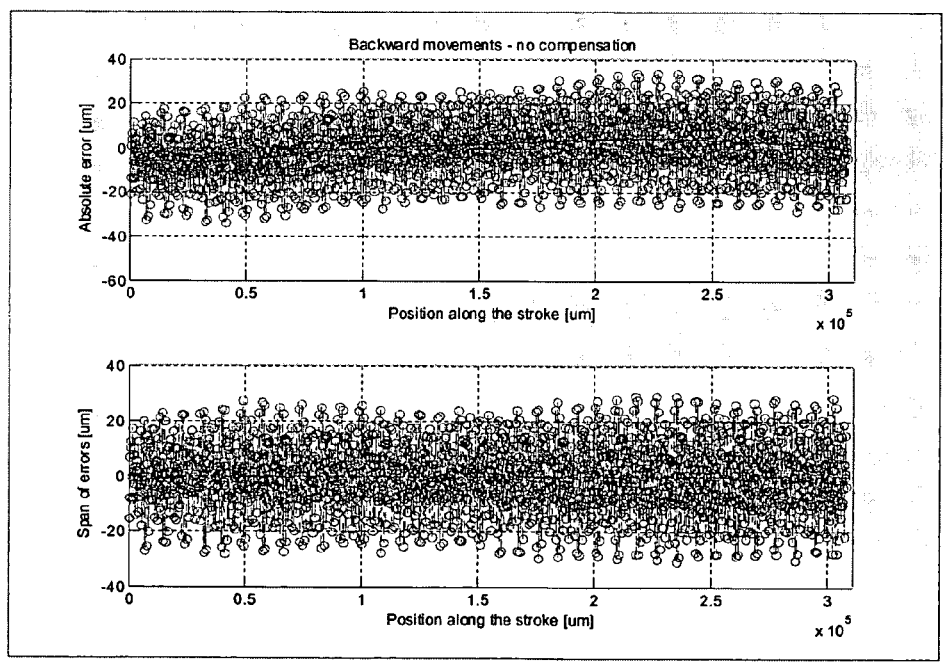
FIG. 13. Absolute position errors and span of errors for backward movements on an uncalibrated linear stepper motor

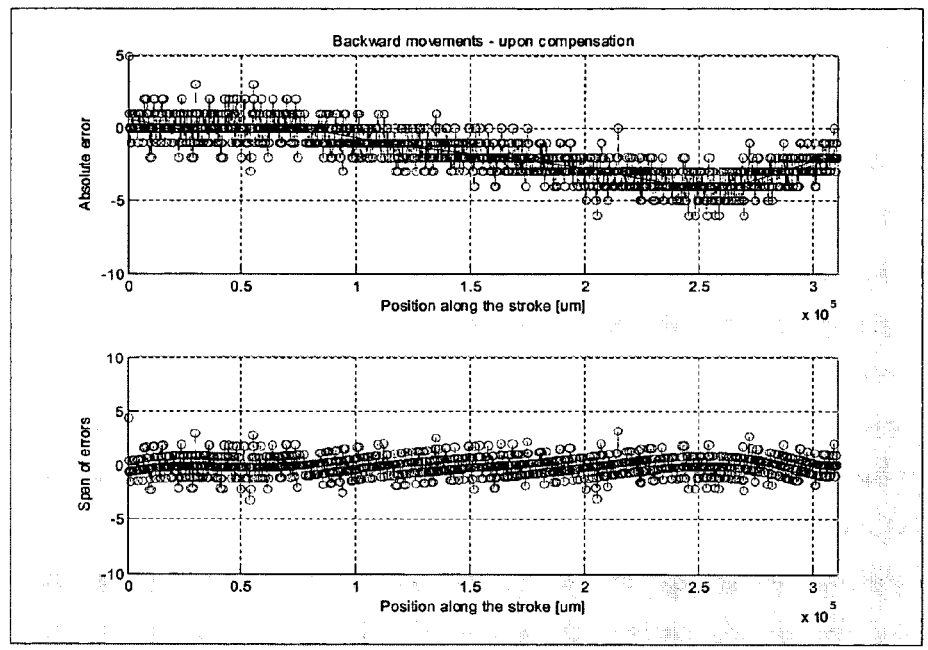
FIG. 14: Absolute position errors and span of errors for backward movements on a calibrated linear stepper motor
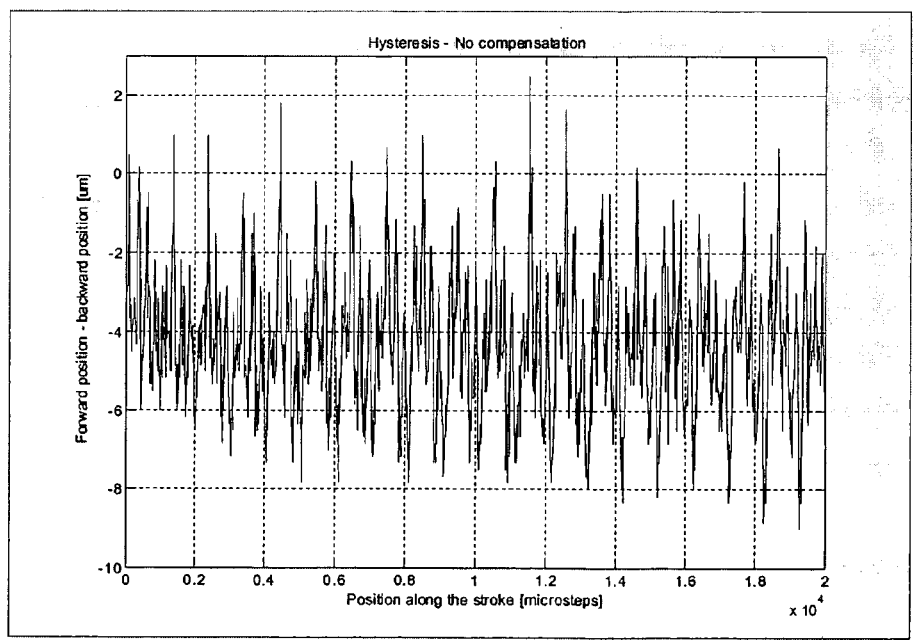
FIG. 15: Hysteresis measured in 100 points along actuator stroke for an uncalibrated linear stepper motor

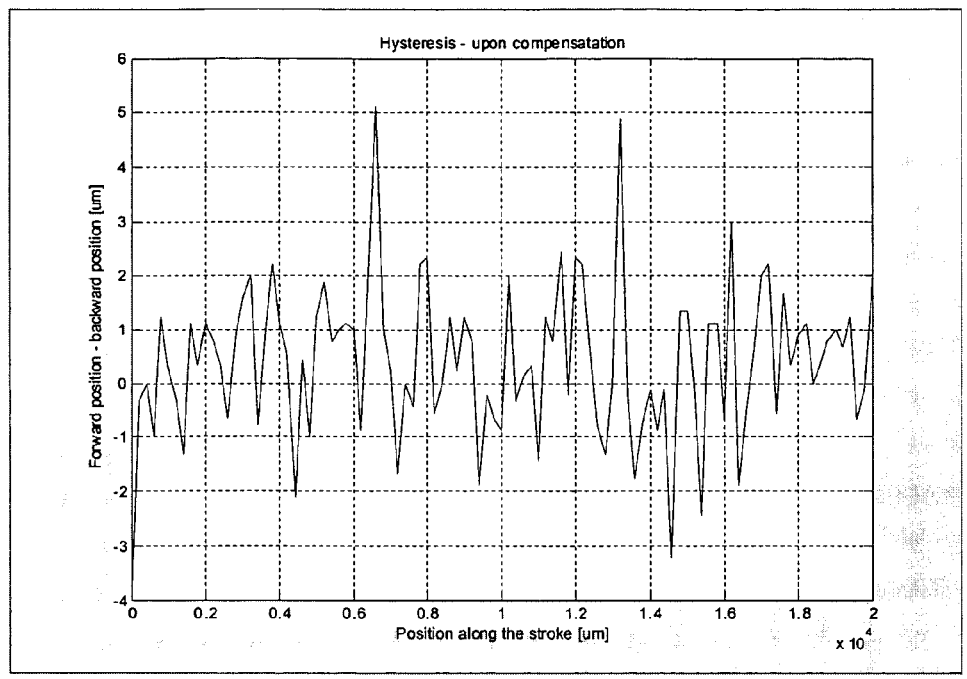
FIG. 16: Hysteresis measured in 100 points along actuator stroke upon actuator calibration.
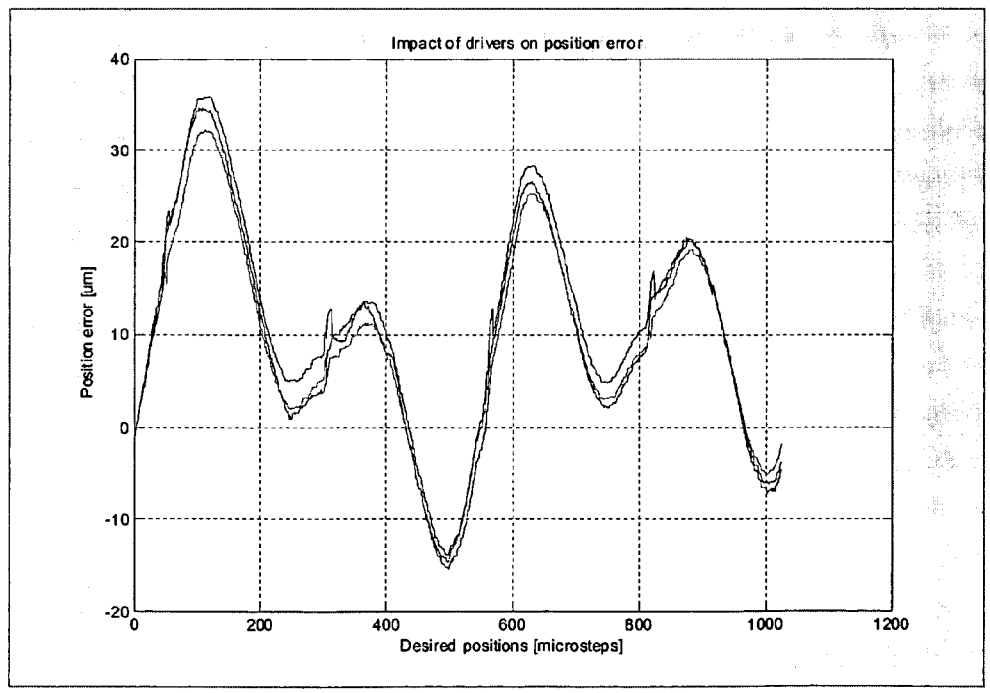
FIG. 17 Impact of motor drivers on the linear stepper motor position error.

METHOD AND APPARATUS FOR PRECISE POSITIONING OF AN OBJECT WITH LINEAR STEPPER MOTORS

CROSS-REFERENCES TO RELATED APPLICATIONS

This application claims the benefit of U.S. Provisional Application No. 60/632,576 filed Dec. 1, 2004, the disclosure of which is incorporated herein by reference in its entirety.

BACKGROUND OF THE INVENTION

The present invention relates generally to linear stepper motors and more particularly to systems and methods for precisely positioning an object using a linear stepper motor.

Linear stepper motors typically include a platen 10 and a forcer 20 as shown, for example, in FIG. 1. The platen 10 is the fixed, passive part of the motor and its length will determine the distance the motor will travel. The platen 10 typically has a number of teeth 12 equally spaced along its length, and is like the rotor in a traditional rotary stepper motor, except it is not a permanent magnet. The forcer 20 typically includes four pole pieces 22 that each have three or more teeth 24. The pitch of each tooth 24 is staggered with respect to the teeth 12 of the platen 10. The forcer 20 uses mechanical roller bearings or air bearings to ride above the platen on an air gap so that the two never physically come into contact with each other. The magnetic field in the forcer is changed by passing current through its coils (e.g., coils A and B). This action causes the next set of teeth 24 to align with the teeth 12 on the platen and causes the forcer to move from tooth to tooth over the platen in stepwise travel. When the current pattern is reversed, the forcer reverses its direction of travel. A linear stepper motor controller controls the current energizing pattern (switching cycle) applied to the coils so that the motor moves in a stepwise, controllable manner. A complete switching cycle includes four full steps, which moves the forcer 20 the distance of one tooth pitch over the platen 10. In a microstepping mode, the forcer can be controlled to move a fraction of a full step, for example, by breaking each applied current step into multiple current steps. For example, multiple current steps can be applied between full positive, zero current and full negative. The typical resolution of a linear motor is of the order of 100 full steps per inch. In microstepping mode, the resolution is greatly increased.

It is known that linear stepper motors are limited in terms of precision and smoothness of motion due, for example, to the presence of cyclic positioning error, thermal expansion error, straightness of the actuator, and other errors due to imperfection in manufacturing of the motor. As a consequence, an error may be introduced between the desired and actual position of the object moved by the motor, especially if the object is located at some distance from the center of the forcer. Also, an error may be introduced between the desired and actual orientation of an object attached to the moving part of the motor (i.e., forcer 20). This is illustrated in FIG. 2.

The positioning of the forcer (point C in FIG. 2) is affected by the cyclic, thermal and random errors in the platen teeth. However, the position of the object P that is off-centered from the ideal line of the motion (X) is affected not only by the positioning error in point C, but also the orientation error ($\phi$), which is mostly due to imperfect straightness of the platen. The positioning error of the object P along the axis X' that is parallel to the axis X can be described as $E = E_x + r \sin(\phi)$, where $E_x$ is the positioning error in point C, r is the distance between points C and P, and $\phi$ is the orientation error. Clearly, the positioning error E is critical in achieving high precision positioning of the object P. It is therefore desirable to provide systems and methods to compensate for not only the linear position error $E_x$ of the forcer, but also the total error E.

For some applications, such as a microarraying apparatus, or a high-precision X-Y stage used in various instruments and machines, it is highly desirable to achieve precise and smooth motion within given specifications. In many applications the solution is based on a lead-screw mechanism rotated by a DC, AC, or stepper motor, and a linear guide that guides the object along the lead-screw. However, the construction of a lead-screw mechanism is not suitable for high speed, high-acceleration applications. For such applications, a mechanism that is based on a linear motor and linear optical encoder offers a range of advantages over the traditional lead-screw mechanism: no transmission (gear), very small friction (when wheels are used) or negligible (when air-bearings are used), very high speed (often exceeding several meters per second), very high accelerations (often exceeding 1G), flexibility in length (platen can be made several meters long), etc. Typically, the linear encoder or some other measuring device is used as a feedback device. However, the cost of typical brushless DC or AC linear motor and a linear optical encoder may be prohibitively expensive and would qualify this technology for "high-end" applications. In other words, many laboratory instruments and machines cannot afford this technology from a cost of goods standpoint.

Hysteresis is an effect that exists in most of electromechanical systems. Linear stepper motors also show differences between achieved positions when moving to the same desired position from two different directions. In some applications, such as printing of biological samples in a form of an array, it may be very important to achieve high positioning precision, regardless of the direction of motion towards the desired position.

Control of linear stepper motors in microstepping mode is performed using microstepping stepper motor drivers. Although these drivers are calibrated to achieve equal distance between microsteps, there exist differences in actual positions of the object attached to the forcer, if different drivers are used with the same motor. The impact of driver characteristics is also one of the effects that should be taken into account when high positioning precision is desired.

Therefore, it would be desirable to provide systems and methods that combine a relatively affordable linear stepper motor with an advanced controller that would provide high positioning precision, but without any position-measuring device. Further, such systems and methods should provide enhanced movement and positioning precision capabilities, including the ability to compensate for cyclic error and hysteresis.

BRIEF SUMMARY OF THE INVENTION

The present invention provides systems and methods for precise positioning of an object using linear actuators based on linear stepper motors operating in microstepping mode using a control algorithm based on compensation table. The method includes compensation of the total error along the object path, which includes the error due to change of the object orientation and the impact of the motor driver.

The present invention provides a positioning apparatus including a linear stepper motor without any device for measuring position. In one aspect, the position error E, and hysteresis, is minimized by using an error-compensation table that tracks error in the actual positioning of the off-centered object in the forward and reverse directions. A linear optical encoder (or some other measuring device) may be used for calibration purposes, however, after a unit is calibrated, the measuring equipment may be removed from the unit.

The present invention advantageously compensates for the nonlinearity caused by various effects including the mounting on the actuator that can deform (bend) the platen to some extent. In one aspect, an on-board calibration setup is provided to automatically obtain the compensation table after the actuator is mounted on the instrument or machine support plate (e.g., on a base plate in a microarrayer).

The present invention also advantageously reduces the positioning error significantly (e.g., up to 10 times or more) without the need for any position feedback device. Moreover, the motion of the object to be moved is smoothened (made uniform) due to the absence of large repetitive error. The uniform and smooth motion may be more important in some applications (e.g., scanning of features on a slide in molecular biology applications), while the positioning precision may be more important in some other applications (e.g., precision X-Y stage in a microarrayer).

Aspects of the present invention are applicable to X-Y stages where a domain of high precision is defined as a rectangle in the X-Y plane. The present invention is also useful for precise positioning and smooth motion of an X-Y-Z assembly, including X and Y actuators that are linear stepper motors, and a Z actuator that is used for vertical positioning of the end-effector (e.g., a microarrayer printhead). High speed and acceleration are achieved in gross motion in the X-Y plane, while the Z-actuator is application dependent and may be constructed in various ways including, for example, a coil actuator (for small payloads), ball-screw stepper motor assembly (for high loads), etc. One application of an X-Y-Z assembly according to the present invention is in a microarrayer that has high precision (few microns), high speed (few meters per second), high acceleration (e.g., 1G or higher), and low cost (there is no need for a position measuring device in the system).

The present invention also eliminates the need for physical adjustment of the home sensor position in the manufacturing process, while still achieving consistent homing towards the same full-current-in-one-coil position always.

The present invention also provides a method of homing that eliminates jerks during homing, resulting in highly repeatable homing, which is of crucial importance for precise positioning.

According to an aspect of the invention, a method is provided for automatically generating a compensation table for use in calibrating a linear stepper motor having a platen and a forcer capable of moving in microsteps linearly along the platen. The method typically includes, beginning at a starting position, moving the forcer along a first linear direction by a first interval of one or more microsteps, determining an actual position of an object attached to the forcer along the first direction using a position measuring device, and recording the actual position of the object in a memory in relation to a total number of microsteps moved from the starting position. The method also typically includes repeating these steps a plurality of times until an end position has been reached. The starting and end positions may define all or a portion of the possible range of motion of the forcer along the platen.

According to another aspect of the invention, a method is provided for positioning an object with high precision using a linear stepper motor operating in a microstepping mode without using a position feedback device, the stepper motor having a platen and a forcer that moves linearly along the platen, wherein the object is attached to the forcer. The method typically includes receiving a command to move the forcer to a desired position, determining whether a movement forward or backward along the platen is required based on a current position of the forcer, and determining a first number of microsteps required to move the forcer from the current position to the desired position using a compensation table storing a plurality of values representing actual positions of the object in relation to a number of microsteps from a home position of the forcer. The method also typically includes moving the forcer the first number of microsteps in the forward or backward direction to the desired position.

According to yet another aspect of the invention, a method is provided for precisely homing a stepper motor operating in a microstepping mode, the motor including a platen and a forcer having two coils for moving the forcer linearly along the platen in microsteps. The method typically includes attaching a homing sensor to the platen, determining a number of microsteps between a homing sensor activation position and a closest full current-in-coil position for a first one of the coils, determining the direction of motion from the homing sensor activation position to the closest full current-in-coil position, and storing the number of microsteps and the direction in a memory.

According to a further aspect of the invention, a linear stepper motor is provided that typically includes a platen, a forcer capable of moving linearly along the platen, and a controller for controlling movement of the forcer in microsteps. The motor also typically includes a compensation table stored in a memory, the table including values representing actual positions of an object attached to the forcer along the platen in relation to a number of microsteps from a starting position of the forcer. In operation, responsive to a signal to move the object to a desired position, the controller determines from the compensation table a first number of microsteps required to move the forcer to the desired position, and the controller controls the forcer to move the first number of microsteps to the desired position without the use of a position feedback device.

According to yet a further aspect of the invention, an X-Y-stage is provided that typically includes a first linear stepper motor configured to control movement of an object in the X-direction, and a second linear stepper motor configured to control movement of the object in the Y-direction. Each linear stepper motor has a forcer capable of moving along a platen in microsteps, and a compensation table stored in a memory, each compensation table including values representing actual positions of the object in relation to a number of microsteps from a starting position of the respective forcer, wherein each forcer operates without a feedback device to move to a precise position using the compensation table. In another aspect, the stage includes an actuator for controlling movement of the object in a Z-direction, which is substantially perpendicular to both the X- and Y-directions.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 1 illustrates an example of a linear stepper motor including a platen and a forcer.

FIG. 2 illustrates errors introduced during movement of an object using a linear stepper motor.

FIG. 3a illustrates an X-Y positioning stage including orthogonal linear stepper motors.

FIG. 3b illustrates a calibration setup including a permanent encoder in one aspect, or an X-Y stage apparatus including a detachable encoder in another aspect.

FIG. 4 shows an example of linear stepper motor cyclic error.

FIG. 5 illustrates the span of achieved positions for the actuator used for FIG. 4, measured in 1500 spots along the stroke of the actuator with movements in forward direction (from smaller to larger positions in microsteps).

FIG. 6a shows the mutual relationship between cyclic error and error due to repeatability. The actual positions obtained in multiple trials vary around the average position only for up to ±5 μm, but the average (cyclic) error can vary in the range [−35, +10] μm.

FIG. 6b illustrates the impact of forcer orientation on the total error when measured at two different distances from the platen.

FIG. 7 illustrates hysteresis for a linear stepper motor, measured in 500 points that are 10 microsteps apart along the stroke of the actuator, obtained from 5 runs.

FIGS. 8a and b illustrate a conventional prior art homing process.

FIG. 9 illustrates aspects of a homing process according to the present invention.

FIG. 10 illustrates a visualization of a compensation table stored in memory according to one embodiment.

FIG. 11 illustrates absolute position errors and span of errors for forward movements on an uncalibrated linear stepper motor.

FIG. 12 illustrates absolute position errors and span of errors for forward movements on a calibrated linear stepper motor.

FIG. 13 illustrates absolute position errors and span of errors for backward movements on an uncalibrated linear stepper motor.

FIG. 14 illustrates absolute position errors and span of errors for backward movements on a calibrated linear stepper motor.

FIG. 15 illustrates hysteresis along an actuator stroke for linear stepper motor before compensation.

FIG. 16 illustrates hysteresis along an actuator stroke for a calibrated linear stepper motor.

FIG. 17 illustrates the impact of motor drivers on the linear stepper motor position error.

DETAILED DESCRIPTION OF THE INVENTION

Figure 18:
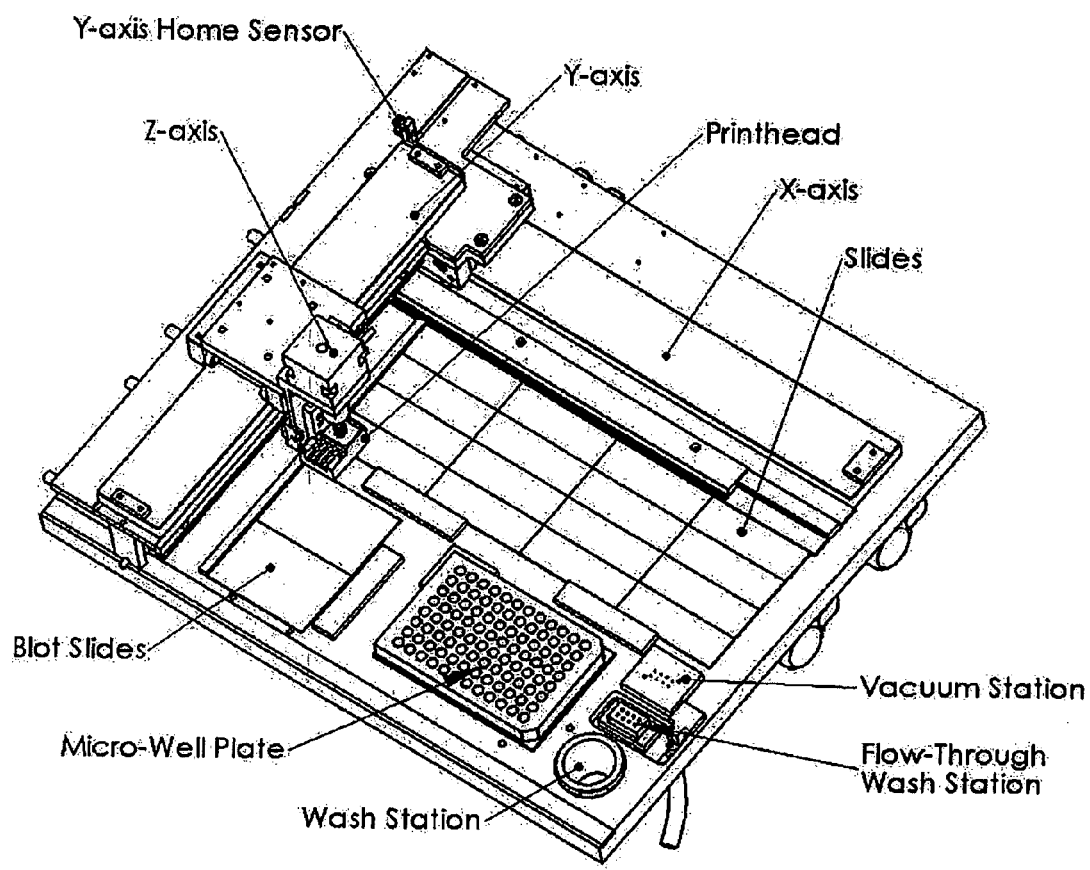
FIG. 18 illustrates an example of a micro arrayer (e.g., X-Y-Z platform) in which the calibration, homing and precise positioning methods of the present invention are particularly useful.

According to one embodiment, as shown in FIG. 1, a linear stepper motor includes a moving forcer 20 and a stationary platen 10. The forcer 20 includes two coils (A and B) inserted in steel cores with teeth 24 and a single permanent magnet encapsulated in an aluminum housing. The forcer 20 moves on air-bearings or wheels along the platen 10: e.g., a photo-chemically etched steel bar with teeth 12 perpendicular to the axis X in FIG. 2 (also shown as a cross-section in FIG. 1). The forcer 20 has 4 sets of teeth 24 facing the teeth 12 of the platen 10 (e.g., at a distance of 40 microns). The distance between these 4 sets of teeth is not a multiple of the platen teeth pitch, but there is an offset so that only one set of the teeth would face the platen teeth. The other sets are offset by ¼, ½, and ¾ of the pitch. By applying the electric current to the first coil (A) the first set of teeth will align with the platen teeth. When the current in A is zero, but the current in the coil B is applied, the third set of teeth will be aligned with the platen teeth. This will result in a small motion, a step that is ¼ of the teeth pitch. When the current in B is reduced to zero, and full current is applied in coil A, but with the opposite direction, the second set of teeth will align with the platen teeth so that the forcer will make another step in the same direction. Finally, by applying the full negative current to the coil B while reducing the current in coil A to zero, will align the fourth set of teeth with the platen teeth, producing another step of motion. As a consequence, the linear stepper motor moves in steps when the coils are energized in a certain sequence. This is similar to the operation of the conventional rotary stepper motor, except that the motion is linear, not rotary. A stepper motor controller (not shown) provides control signals to energize the coils in the desired sequence. In certain aspects, the controller includes a memory (e.g., ROM) for storing compensation table data and other data as will be described herein.

Since in one aspect the teeth pitch is about 1 mm, a step is ¼ of the pitch that is about 250 μm. Smaller steps are achieved by applying microstepping in which the current in A and B is changed in smaller steps than full positive, zero, and full-negative. The current vector composed of A and B current is changed in equal angular micro-steps (e.g., 256 microsteps per full step). This allows microstepping in linear increments of about 1 μm per micro-step. It is understood that the 1 mm tooth pitch (and also the 1 μm microstep) are exemplary, and that the present invention is applicable to actuators including teeth pitch of any dimensions whether smaller or larger than this example.

Cyclic Error

Each actual linear microstep increment is influenced by the electro-magnetic phenomena, teeth geometry, materials used, gap distance, temperature of the platen and forcer, friction in wheels (if air-bearings are not used), etc. The error between the actual and ideal increments implies a position error that can reach about 50 μm (or even more) although the microstep is only 1 μm. The error depends on the position on the platen. It has a repetitive component (called "cyclic error" that repeats with the frequency determined by the teeth pitch) and a moving average component (that changes along the platen length). The cyclic error is frequently assumed equal along every tooth pitch. In fact, it may change and it may be different from one tooth to another tooth.

FIG. 4 illustrates an example of cyclic error for a linear stepper motor (Baldor Electronics—Single axis 5 lb forcer LMSS1302-2WWO and platen LTS13WB). In the example shown, the motor had pitch of 1016 μm (4 full steps, each 254 μm) and it was controlled with 256 microsteps per full step (one microstep corresponds to 0.9921875 μm). So, the cyclic error is repeated with 4×256 microsteps=1024 microsteps. In FIG. 4, the x-axis shows commanded position in microsteps, and the y-axis shows the difference between the ideal position in microns (μm) and the actual position measured with a linear optical encoder. In this example, the cyclic error is in the approximate range [−35, 10] μm. On the other hand, this actuator has much better repeatability. The repeatability of this actuator was shown to be in the range ±5 μm. FIG. 5 illustrates the span of achieved positions for the same actuator, measured in 1500 spots along the stroke of the actuator with movements in forward direction (from smaller to larger positions in microsteps). The actual positions were collected in 100 repeated movements to the same positions in microsteps, and the span of achieved positions was calculated for each point along the stroke. One can see that the span of errors due to the inherent motor characteristics had a maximum of 9 μm, i.e., its repeatability is better than ±5 μm in all the measurement points along the actuator stroke.

FIG. 6a shows the mutual relationship between cyclic error and error due to repeatability. The actual positions obtained in 4 trials vary around the average position only for up to ±5 μm, but the average (cyclic) error can vary in the range [−35, +10] μm Impact of Orientation Error For off-centered objects that are to be positioned by a linear stepper motor, i.e., the objects that are located at some distance r from the center of the forcer, the total position error will include the linear position error which is the consequence of the object orientation error, as illustrated in FIG. 2. The positioning error of the object P along the axis X' that is parallel to the axis X can be described as $E=E_x+r \sin(\phi)$, where $E_x$ is the positioning error in point C, r is the distance between points C and P, and $\phi$ is the orientation error. Clearly, the positioning error E is critical in achieving high precision positioning of the object P. The slow varying object orientation error is mostly due to the imperfect straightness of the platen (if the object is properly fixed to the forcer). FIG. 6b illustrates the difference between the position error measured by a remote linear optical encoder positioned at 30 cm distance from the center of the platen, and the position measured by a "middle" encoder positioned at 15 cm distance from the center of the platen (filtered signal). One can see that as the orientation of the object/forcer is changed, the difference in position error measured 15 cm apart oscillates in the range of about 3-4 microsteps.

Therefore, a strategy where the total error, and in particular the cyclic error, is compensated would be highly beneficial. The compensation table method according to the present invention is useful for compensating the total error. Moreover, it is useful for compensating the total error along the object path (e.g., X' in FIG. 2). The present invention is further applicable to X-Y stages. This situation is shown schematically in FIG. 3a. The calibration of the X-Y stage shown in FIG. 3a is performed with the optical encoders ENCx and ENCy that are placed along the axes X' and Y', parallel to corresponding actuators X and Y while crossing the mid-point of the region R, and at certain distances from the actuators. The influence of the undulation (straightness of the platen X and platen Y) is therefore minimized.

FIG. 3b illustrates a calibration setup for a linear stepper motor carrying an object (payload) that is located at a certain distance from the platen. The region of interest is shown as a rectangular area, and the linear scale is positioned in the middle of this region. In one aspect, the optical encoder sensor (head) is attached to a bracket that is attached to the forcer. This bracket is passive and its purpose is to carry the sensor so that it is positioned above a linear scale at a distance that is precisely defined by the manufacturer of the optical encoder. This calibration setup is advantageously used during production to generate a calibration table before the actuator is removed and integrated into a machine. In another aspect, FIG. 3b equally illustrates an X-Y stage apparatus in which X and Y actuators are linear stepper motors and in which the X actuator has been calibrated as discussed above. In this aspect, the stage apparatus does not have any optical encoder attached permanently. However, on-board calibration may be performed by attaching a removable optical encoder (or other measuring device) to the unit. In this aspect, the linear encoder includes a head (sensor) and a linear scale that can be attached or detached to/from the system. This optical encoder can be used for calibrating the X axis (obtaining the compensation table, checking the precision, etc.) "on-board". This is typically done if the actuator or driver is replaced so that the unit has to be (re-)calibrated. The Y-axis actuator may similarly be calibrated, for example using a second removable encoder, or repositioning the encoder used to calibrate the X-axis so that it may be used to calibrate the Y-axis motor.

FIG. 18 illustrates a micro arrayer (e.g., X-Y-Z platform) in which the calibration, homing and precise positioning methods of the present invention are particularly useful. As shown, the arrayer includes X and Y axes that are based on linear stepper motors (as described herein) and that are not operated with optical encoders (although removable "on-board" optical encoders may be used for re-calibration as discussed above). As shown, a Z assembly attached to the forcer of the Y actuator includes a bracket, a rotary stepper motor with a lead-screw mechanism, a precision linear guide, and a printhead. This stepper motor rotates a nut (located within the motor housing—not shown) that actuates a lead-screw that is prevented from rotation by a housing around it. Therefore, the lead screw moves in the vertical direction only. The printhead is attached to the moving block of the linear guide firmly, and it is also attached to the bottom part of the lead-screw elastically. Therefore, the printhead moves in the vertical direction (determined by the precision of the linear guide) actuated by the stepper motor through the transmission based on the lead-screw. This is just one example of a Z axis assembly construction. Clearly, the Z axis assembly can be constructed in various other ways and other means (voice coil; DC motor, etc.) as would be apparent to one skilled in the art. In one aspect, the printhead is populated with pins (not shown) that are floating in the corresponding holes. The pins can pop up when touching an object when the Z axis moves downwards. The Micro-Well plate is exchangeable and it may contain different liquid samples (biological, chemical, etc.). The pins enter the wells to pick up the samples using a capillary or some other sample extraction means. In one aspect, the (extracted) samples are transferred by moving Z up, and moving X and Y forcers so that the pins arrive on top of the blot slides. A gentle tapping on the blot slides allows for excess liquid to be removed from the pins. The head is then re-positioned by the X-Y-Z actuators above the slides. Placement of sample on the slides may be accomplished by touching the slides in accordance to a desired pattern. After printing on the slides, the pins are transferred to the wash area, where they are cleaned by the use of a vacuum station, a flow-through wash station and a passive wash station that contain some washing solutions. After cleaning and drying the pins, the whole process can repeat with the printhead entering the next set of samples (wells) in the micro-well plate.

In one aspect, the arrayer is a small, economical, desktop instrument intended to print arrays on coated glass slides or membranes from standard microtiter plates, e.g., 96-well, 384-well and 1536-well plates. The samples may contain single or double-stranded DNA, proteins, or other materials. As discussed above, printing may be based on the capillary effect that allows attracting the sample, transferring the sample, and disposing it on a surface. The sample carrier, in this aspect, includes a round-tip pin that can be a quill pin (with slot) or a solid pin (with solid cylindrical tip). The pins are preferably arranged in a matrix form in the printhead. The printing process starts with dipping the pins into the microwell plate, tapping a few times on the blot slide, printing on slides, and washing/drying the pins. Then the pins would dip into another set of wells in the plate, tap a few times on slightly different positions on the blot slide, print on all slides, hitting slightly different locations, and finally get washed and dried. This process would repeat until all samples are printed from the current microwell plate. After that, the user can replace the plate and continue the printing process. The spot pattern on the slides substrates may be interlaced. The distance between the spots could be as small as 200 microns. Clearly, the precision and the speed of the X and Y actuators are very important for achieving high quality printing.

Hysteresis

Hysteresis is a well-known effect that exists in most of electromechanical systems. The average position where the motor stops when moving in positive direction may not be identical to the position when moving in a backward or reverse direction. The difference between the average actual position when moving in the forward and backward directions to the same position in microsteps is defined as hysteresis for that position. FIG. 7 illustrates average hysteresis for a linear stepper motor, measured in 500 points that are 10 microsteps apart along the stroke of the actuator, obtained from 5 runs. From this, one can see that hysteresis of a linear stepper motor also has fluctuations. For the actuator and the driver used in this study (same as actuator for FIG. 4), hysteresis varied between 1 and 15 µm for different points along the stroke. It would therefore be beneficial to eliminate the effect of hysteresis in order to achieve high positioning precision when moving to the same position from different directions.

Compensation Table Generation

According to one aspect of the present invention, the total error along the object path is compensated by calibrating the actuator along the object path using an optical non-contact linear encoder located at a certain distance from the center of the actuator, close to the region where high positioning precision is required. Instead of an optical encoder, a laser-interferometer or any similar equipment that measures the distance may be used. A compensation table is created by recording the actual positions that are achieved by the object when commanded to advance for a certain number of microsteps (for example, 16 microsteps). The table is recorded for all points along the platen. A compensation table is preferably generated for both the forward and backward directions of motion along the platen. A table is stored in a memory unit such as the permanent memory (ROM) of the controller or on a hard drive of a host computer controlling the device. In an advanced form of the compensation table generation algorithm, the data for a table is collected and is recorded multiple, N, times (e.g., 5 or more times) over the full platen length, and an averaged number of microsteps over these N experiments is recorded and stored. This strategy minimizes the influence of the repeatability of the actuator on the quality of the data in the table. Since the measurement of the actual positions of the object is performed along the actual object path, or in the area where high precision is required (which is at certain distance from the actuator axis), the compensation table will include all sources of errors, including the orientation error of the object and the impact of the motor driver. The process of collecting data for and generating compensation tables for an actuator is also referred to as actuator calibration.

FIG. 10 illustrates a visualization of a compensation table stored in memory according to one embodiment. The table in FIG. 10 shows the average of the positions collected for forward and backward movements for commanded positions in $n_s$ microstep increments. For example, $n_s$ may be any controllable value (e.g., 2 or 10 or 12 or 16 or more) as desired. Selecting a larger value for $n_s$ will tend to reduce the time required to generate the table. In the table, $y_f(k)$, k=0, 1, 2, . . . represents the average actual position when the motor was command to move in a forward direction to $kn_s$ position in microsteps, while $y_b(k)$, k=0, 1, 2, . . . represents the average actual position when the motor was command to move in a backward direction to $kn_s$ position in microsteps.

Granularity of the Compensation Table

The process of collecting compensation data can be a relatively long process, since the data is preferably collected for a relatively large number of points along the whole stroke of the actuator to achieve good precision of the linear interpolation. If the number of points (positions in microsteps) in which the average actual positions in µm is measured, is large, the linear interpolation will be good, but the time for collecting the table may be long. On the other hand, if the number of rows in the table for a given stroke is small the table will be obtained in shorter time, but the precision of interpolation may not be as good. For this reason, it is desirable to optimize the number of points (positions in microsteps) in which the average actual positions in µm are measured, i.e., to optimize the number of rows in the compensation table.

In one aspect, the optimization of the number of rows in the compensation table is preferably done in such a way that the error due to linear interpolation is not larger than ±1 microstep. In the example of the actuator from FIG. 4, for example, it is sufficient to collect the average actual position every 16 microsteps, i.e., 16 times within each full step.

Impact of Motor Repeatability

Due to inherent motor characteristics, the motor may, when commanded to go to a certain position several times, reach different actual positions. The span of errors defines motor repeatability. In order to obtain high quality of the compensation table, it is desirable to take an average value of the actual positions obtained from a sufficient number of trials. In one aspect, therefore, the process of collecting the actual positions for each point along the actuator stroke is repeated for a number of times. The number of times can be determined experimentally. It is also desirable to optimize the number of scans needed to obtain average position values, since this number also affects the time required to calibrate an actuator. For example, for the actuator used in FIG. 4 it is sufficient to perform 6 scans along the actuator stroke to obtain average actual positions (i.e., if the number of scans would be increased the average positions would not change more than for ±1 microstep).

Impact of Static Friction

Movements that lead to a certain position before measuring the actual position should be long enough to eliminate the impact of static friction that may exist in the actuator. Movements that are too short are not recommended in the process of collecting the compensation table. For the actuator used in FIG. 4, for example, 200 microstep movements were used, although the table is collected for each 16 microsteps.

Impact of Settling Time

Upon reaching a certain position, and before measuring the actual position with an encoder, the motor should be allowed enough time to settle down to obtain reliable data. The settling time varies with actuators and should be determined experimentally. The wait time upon finishing the movement in the process of collecting a compensation table should be somewhat larger than the settling time of the actuator. On the other hand, too large a waiting time could unnecessarily increase the time required to collect the compensation table. For the actuator used in FIG. 4, the wait time was set to be 160 ms, since the settling time was 150 ms.

Impact of Motor Drivers

The characteristics of the stepper motor drivers can have a significant impact on the positioning of the stepper motor and on its hysteresis magnitude. FIG. 17 illustrates the difference of the cyclic error for the same stepper motor used in FIG. 4, but using three driver units of the same type (Testra Corporation Microstepping driver SS483-R). One can see that in the example, the total position varied up to 4 μm (or approximately microsteps) when the drivers were exchanged for the same actuator. To eliminate the impact of drivers to the process of actuator calibration, it is preferred that the stepper motor be calibrated together with its driver and its home sensor. If the driver would have to be replaced, the actuator should be recalibrated.

High Precision Homing Process

A consistent homing process is important for achieving positioning precision at the level of a full step for any stepper motor, since usually no feedback about actual motor position exists when the motor is in use. If positioning precision of the order of microsteps is to be achieved, the homing process should be extremely reliable and consistent, e.g., ±1 microstep. In order to fully exploit the advantages of the compensation algorithm of the present invention, the actual actuator position after homing, before collecting the compensation data, and later when it is being used in the process of object positioning, should be almost identical. If homing would be inconsistent, there could exist a shift in positions in the table, and compensation for the cyclic error would be poor.

Consistent and reliable homing is achieved, in one aspect, by selecting a precise homing sensor, attaching the sensor directly to the actuator so that it moves with the actuator if it is being dismounted or remounted on the machine, and by implementing a strategy for homing that eliminates jerks during homing. If the home sensor would be moved with respect to the motor, the process of actuator calibration would have to be repeated.

According to one embodiment, a homing process is provided to home the actuators in such a way that there is no need for a physical adjustment of the position of the homing sensor during manufacturing, and such that there is no large jump of the forcer during homing (upon resetting the motor driver), and such that homing to the same position is reliably performed. Large jumps upon resetting the driver are not convenient since they may cause inconsistent actuator position upon applying full current-in-one-coil only, i.e., inconsistent homing process. For example, the conventional homing process as shown in FIG. 8a could result in inconsistent homing. During the conventional homing process, a forcer is moving slowly in microstepping jog mode in the negative direction of the axis until the signal from the homing sensor is not changed. At that moment the motion stops and the driver of the motor is reset, this being equivalent to introducing the full current in coil A of the motor. At that moment, the forcer jumps from its current position to the position that corresponds to the nearest Full-current-in-coil-A position. If the position where the sensor is activated is close to the middle between two Full-current-in-coil-A positions as shown, for example, in FIG. 8b, it may happen (since the sensor is not activated exactly at the same position always) that the forcer jumps to either of the two closest Full-current-in-coil-A positions (which are 4 full steps apart). This would result in unsafe homing with very large position error. Usually, the homing sensor would have to be physically moved close to either of the Full-current-in-coil-A positions to avoid this ambiguity. Additionally, there would be a large jump of the forcer, which would result in an imprecise forcer position around the Full-current-in-coil-A position.

A homing process according to one embodiment of the present invention will now be described with reference to FIG. 9. During the manufacturing process the distance between the home sensor activation and the closest Full-current-in-coil-A position is determined and stored, e.g., in the file with the compensation table for that actuator. Later, in the process of homing, an additional movement upon home sensor activation is introduced (that would bring the forcer close to Full-current-in-coil-A position), before resetting the driver. Even if the position where the homing sensor is activated varied a little bit, the forcer would always be brought close to the same Full-current-in-coil-A position, and homing would be consistent.

To determine the distance in microsteps (N_dist) between the home sensor activation and the closest Full-current-in-coil-A position, at the beginning of the homing process, in one aspect, the driver is reset to achieve one-coil position and the counter that measures the position in microsteps is reset. Next, the actuator (with homing sensor) is moved slowly backwards until the homing sensor is activated and the position in microsteps (N_home) is obtained. The remainder of the division of this number and the number, n, of microsteps in a tooth pitch distance of the platen is then calculated:

$$N\_dist = \text{Remainder}(-N\_home/n)$$

(For example, for one motor, n is 1024=4×256 microsteps between two Full-current-in-coil-A positions, since there are 4 full steps in a tooth pitch distance, and there are 256 microsteps per full step.) If the distance is in the range [0, n/2] (e.g., [0,512]), the actuator should be moved in a positive direction (forward) for HOMEPOS=N_dist. If this distance is larger than n/2 (one half of distance between two Full-current-in-coil-A positions), i.e., in the range [n/2, n] (e.g., [512,1024]), the actuator should be moved in a negative direction (further backwards) for:

$$HOMEPOS = N\_dist - n$$

The HOMEPOS information can be stored in the file with the actuator compensation data. Homing is performed in such a way that when the homing sensor is activated, the motor is moved for the specified distance (step for HOMEPOS), and then the driver is reset. This is equivalent to moving the sensor. In this way, no visible jump of the forcer occurs during homing and no need for physical adjustment of the sensor is required in the manufacturing process.

Precision Positioning Using a Compensation Algorithm

Once the compensation table has been generated, it can be used by the actuator controller to achieve high positioning precision. For each movement to a given desired actuator position $y_d$ in µm, it is first determined whether a movement forward or backward is required from the current motor position y. The actuator position $x_d$ to be commanded to the motor in order to achieve a desired position $y_d$ in µm is calculated by interpolating between the entries in the compensation table. In one embodiment, the corresponding actuator position $x_d$ to be commanded to the motor in order to achieve desired position $y_d$ in µm is calculated using a linear interpolation algorithm as will now be described. For forward movements, if the desired actuator position in µm $y_d$ lies between rows k and (k+1) in the compensation table, i.e., if $$y_f(k) \leq y_d < y_f(k+1), \quad (1)$$

then the corresponding desired motor position to be commanded to the motor is calculated as $$x_d = \frac{y_d - y_f(k)}{(y_f(k+1) - y_f(k))/n_s} + kn_s. \quad (2)$$

For backward movements, if the desired actuator position in µm, $y_d$, lies between $$y_b(k) \leq y_d < y_b(k+1) \quad (3)$$

then the corresponding desired motor position in microsteps is calculated as $$x_d = \frac{y_d - y_b(k)}{(y_b(k+1) - y_b(k))/n_s} + kn_s. \quad (4)$$

It is evident that $x_d$ is a floating point number since it is obtained as a result of a linear interpolation. In order to obtain the corresponding integer number of microsteps n to be commanded to the motor, the floating point number is rounded to the nearest integer:

$$n = [x_d]. \quad (5)$$

To get the actual position $y_a$ in microns that corresponds to this integer, another interpolation of the corresponding compensation table is performed. If the forward table was used, $y_a$ becomes $$y_a = \frac{y_f(k+1) - y_f(k)}{n_s}(n - kn_s) + y_f(k), \quad (6)$$

where index k is determined to satisfy $$kn_s \leq n < (k+1)n_s. \quad (7)$$

If the backward table was used, $y_a$ becomes $$y_a = \frac{y_b(k+1) - y_b(k)}{n_s}(n - kn_s) + y_b(k). \quad (8)$$

If n is commanded to the actuator, it will move to $y_a$ position on average, which will be very close to the desired position $y_d$ (any difference is due to the discrete nature of the stepper motor). For a large number of moves towards $y_a$, the actual positions may vary around $y_a$ only in the range of actuator repeatability. No cyclic error or position error due to object orientation error will exist, and hysteresis will be substantially eliminated. If the motor is calibrated together with its driver, which will be later used in the real application, there will be additional error due to differences in motor drivers.

A fast process of searching through the compensation table for the right index k which satisfies equation (1) or (3) is possible, since the deviation from ideal positions due to cyclic error is relatively small compared to the ideal position itself.

Experimental Comparison of Positioning Precision Before and Upon Compensation

A comparison of the positioning precision before and upon compensation for the same linear actuator used in FIG. 4 is shown in FIGS. 11 to 16. FIG. 11 illustrates average absolute position error (including the error due to object orientation change) measured in 1550 points along the actuator stroke for forward direction of motion, as well as the span of errors in each of the points (upon eliminating the mean error). The actual positions were measured 65 mm distance from the actuator axis. As can be seen in FIG. 11, uncompensated motion had the span of errors in the range of over ±25 µm (or approximately ±25 microsteps). The cyclic error would cause that positions that are relatively close to each other can vary for about ±25 microsteps or even more, while the repeatability of the actuator is only ±5 µm (microsteps).

Upon creating a proper compensation table for this actuator, and applying control signals based on the compensation algorithm, e.g., equations (1)-(8), the span of errors shows considerable improvement. FIG. 12 shows absolute position error upon compensation, as well as the span of errors (upon eliminating mean errors) for the same actuator used for FIG. 11 when calibrated. One can see that in the example of this actuator, compensated motion showed the span of errors in the range of less than ±5 µm (or approximately microsteps), as opposed to ±25 for an uncalibrated actuator. By eliminating the cyclic error, positions that are relatively close to each other can vary for about ±5 microsteps or even less, this being in the range of the actuator repeatability itself.

Similar results are obtained for backwards movements, as illustrated in FIGS. 13 and 14. FIG. 13 shows position errors for backward direction of motion if no compensation algorithm is applied. Upon compensation of backward movements, the cyclic error is again eliminated and reduced to the level of the actuator repeatability, as illustrated in FIG. 14.

FIG. 15 illustrates the hysteresis measured in 100 spots along actuator stroke for an uncalibrated actuator. One can see that if no compensation algorithm is applied, hysteresis can vary between 3 and −9 µm. Upon creating a proper compensation table for this actuator, and applying the compensation algorithm, e.g., equations (1)-(8), hysteresis shows considerable improvement as illustrated in FIG. 16.

One can see that the average hysteresis was reduced from about −4 to about 0 μm (or approximately the same number of microsteps).

While the invention has been described by way of example and in terms of the specific embodiments, it is to be understood that the invention is not limited to the disclosed embodiments. To the contrary, it is intended to cover various modifications and similar arrangements, in addition to those discussed above, as would be apparent to those skilled in the art. Therefore, the scope of the appended claims should be accorded the broadest interpretation so as to encompass all such modifications and similar arrangements.

What is claimed is:

1. A method of automatically generating a compensation table for use in calibrating a linear stepper motor having a platen and a forcer capable of moving in microsteps linearly along the platen, the method comprising:
    a) beginning at a starting position, moving the forcer along a first linear direction by a first interval of one or more microsteps;
    b) determining an actual position of an object attached to the forcer along the first direction using a position measuring device;
    c) recording the actual position of the object in a memory in relation to a total number of microsteps moved from the starting position; and
    d) repeating steps a), b) and c) a plurality of times until an end position has been reached.

2. The method of claim 1, further including:
    e) repeating steps a), b) and c) a plurality of times along a second linear direction opposite the first direction until the forcer returns approximately to the starting position.

3. The method of claim 2, further comprising:
    repeating steps a) through e) a plurality of times;
    taking the mean value of the actual object positions recorded for each interval moved for both the first and second directions; and
    recording the mean values in the memory in relation to each interval moved such that the compensation table comprises the mean values of the actual object positions.

4. The method of claim 1, further comprising:
    repeating steps a) through d) a plurality of times;
    taking and storing the mean value of the actual object positions recorded for each interval moved such that the compensation table comprises the mean values of the actual object positions.

5. The method of claim 1, wherein a sufficient time interval is allowed to elapse between steps a) and b) for each repetition after the forcer has moved and before the encoder determines the actual position.

6. The method of claim 5, wherein the sufficient time interval is longer than a settling time of the forcer and the object.

7. The method of claim 1, wherein steps a) through d) are performed on a platform including said position measuring device, wherein the method further includes removing the position measuring device after the compensation table has been recorded.

8. The method of claim 1, wherein the linear stepper motor includes a motor driver attached thereto.

9. A method of positioning an object with high precision using a linear stepper motor operating in a microstepping mode without using a position feedback device, the stepper motor having a platen and a forcer that moves linearly along the platen, wherein the object is attached to the forcer, the method comprising:
    receiving a command to move the forcer to a desired position;
    determining whether a movement forward or backward along the platen is required based on a current position of the forcer;
    determining a first number of microsteps required to move the forcer from the current position to the desired position using a compensation table storing a plurality of values representing actual positions of the object in relation to a number of microsteps from a home position of the forcer; and
    moving the forcer said first number of microsteps in the forward or backward direction to the desired position.

10. The method of claim 9, wherein the values are stored in the table in increments of multiple microsteps, wherein moving to the desired position is determined to require a number of microsteps in between two of said stored increments, and wherein the step of determining the first number of microsteps includes interpolating between two or more of said increments.

11. The method of claim 9, wherein the table stores values representing actual positions in relation to a number of microsteps from the starting position along a forward direction to an end position and in a reverse direction back to the starting position such that hysteresis is substantially eliminated when the forcer moves in the reverse direction.

12. A method of precisely homing a stepper motor operating in a microstepping mode, the motor including a platen and a forcer having two coils for moving the forcer linearly along the platen in microsteps, the method comprising;
    attaching a homing sensor to the platen;
    determining a number of microsteps between a homing sensor activation position and a closest full current-in-coil position for a first one of said coils;
    determining the direction of motion from the homing sensor activation position to said closest full current-in-coil position; and
    storing the number of microsteps and the direction in a memory.

13. The method of claim 12, further comprising:
    responsive to receiving a signal to return to a home position, moving the forcer from a current position towards the homing sensor until the homing sensor is activated; and thereafter
    moving the forcer for the stored number of microsteps in the stored direction;
    applying full current in one of said coils; and
    resetting the forcer position.

14. The method of claim 12, wherein determining the number of microsteps includes:
    applying full current in one of said coils and resetting the forcer position;
    moving the forcer towards the homing sensor in microsteps and counting the number of microsteps (N_home) until the homing sensor is activated;
    calculating N_dist=Remainder(−N_home/n), where N_dist is said number of microsteps, and Remainder denotes taking the remainder of the division; and
    determining whether N_dist is greater than or less than n/2, where n is the number of microsteps between two full current-in-coil positions for the first coil, wherein if greater, the number of microsteps for which the forcer should be moved before applying full current in one coil (HOMEPOS) is calculated as N_dist−n, and if less than n/2, HOMEPOS is calculated as N_dist, wherein HOMEPOS includes the direction of motion upon activating the homing sensor and before applying the full current.

15. A linear stepper motor, comprising:
a platen;
a forcer capable of moving linearly along the platen;
a controller for controlling movement of the forcer in microsteps;
a compensation table stored in a memory, the table including values representing actual positions of an object attached to the forcer along the platen in relation to a number of microsteps from a starting position of the forcer,
wherein responsive to a signal to move the object to a desired position, the controller determines from the compensation table a first number of microsteps required to move the forcer to the desired position, and wherein the controller controls the forcer to move said first number of microsteps to the desired position without the use of a position feedback device.

16. The motor of claim 15, wherein the values in the table are stored in increments of multiple microsteps, wherein if the movement to the desired position requires a number of microsteps in between two of said stored increments, the controller interpolates between two or more of said increments to determine the first number of microsteps.

17. The motor of claim 15, wherein the table stores values representing actual positions in relation to a number of microsteps from the starting position along a forward direction to an end position and in a reverse direction back to the starting position such that hysteresis is substantially eliminated when the forcer is controlled to move in the reverse direction.

18. An X-Y-stage, comprising:
a first linear stepper motor configured to control movement of an object in the X-direction; and
a second linear stepper motor configured to control movement of said object in the Y-direction;
wherein each linear stepper motor has a forcer capable of moving along a platen in microsteps, and a compensation table stored in a memory, each compensation table including values representing actual positions of the object in relation to a number of microsteps from a starting position of the respective forcer, wherein each forcer operates without a feedback device to move to a precise position using the compensation table.

19. The X-Y stage of claim 18, wherein each compensation table stores values representing actual positions in relation to a number of microsteps from the starting position along a forward direction to an end position and in a reverse direction back to the starting position such that hysteresis is substantially eliminated when the forcer moves in the reverse direction.

20. The X-Y stage of claim 18, further comprising an actuator configured to control movement of said object in the Z-direction, said Z-direction being substantially perpendicular to a plane defined by the X- and Y-directions.

* * * * *